May 17, 1938.  C. R. WROBBEL  2,117,753
WINDMILL
Filed April 30, 1937   2 Sheets-Sheet 1

Inventor
Charles Raymond Wrobbel

By Clarence A. O'Brien
Hyman Berman
Attorneys

May 17, 1938. C. R. WROBBEL 2,117,753
WINDMILL
Filed April 30, 1937   2 Sheets-Sheet 2

Inventor
Charles Raymond Wrobbel

By Clarence A. O'Brien
Hyman Berman
Attorneys

Patented May 17, 1938

2,117,753

UNITED STATES PATENT OFFICE 2,117,753

WINDMILL

Charles Raymond Wrobbel, Kingfisher, Okla.

Application April 30, 1937, Serial No. 140,013

1 Claim. (Cl. 170—68)

My invention relates to improvements in variable pitch windmills for use more particularly as wind driven instrumentalities for operating a generator or the like.

The invention is designed particularly with the end in view of providing a simply constructed and efficient mechanism for automatically varying the pitch, or angle, of the blades of the windmill uniformly under the action of centrifugal force and in degree determined by the speed at which the windmill is rotated.

Other and subordinate objects are also comprehended by my invention, all of which, together with the exact nature of my improvements will be readily understood when the following description and claim are read with reference to the drawings accompanying and forming a part of this specification.

Figure 1:
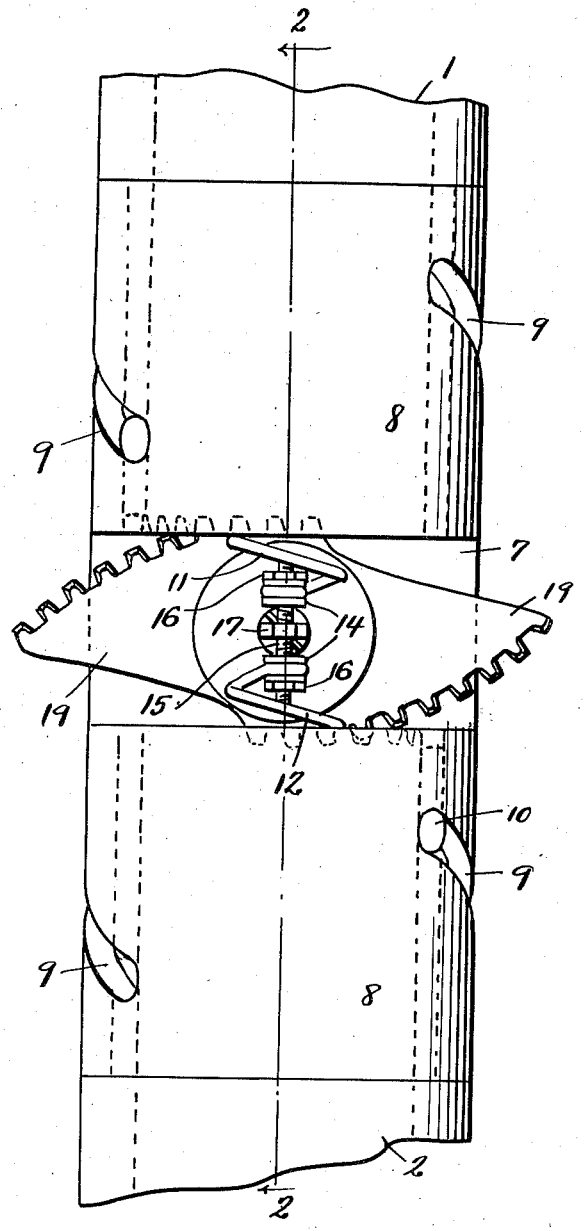
Figure 2:
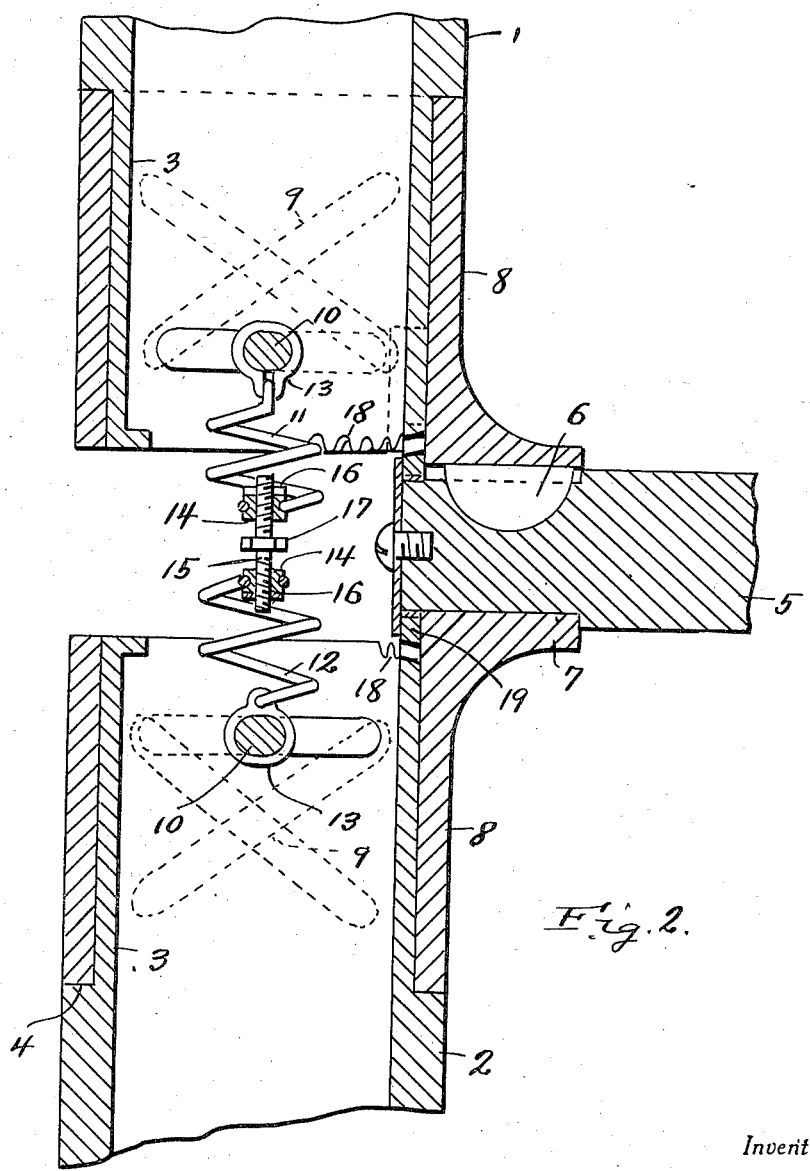

In said drawings:

Figure 1 is a fragmentary view in front elevation of a windmill equipped according to my invention, and Figure 2 is a view in vertical section taken on the line 2—2 of Figure 1 looking in the direction indicated by the arrows.

Referring to the drawings by numerals, in the illustrated embodiment of my invention, the windmill blades, indicated at 1 and 2, are formed with a cylindrical reduced inner end shank 3 and a shoulder 4 at the juncture of the shank with the blade. The windmill shaft 5 has secured to the forward end thereof, as by the key 6, a hub member 7 including a pair of sleeves 8 disposed in spaced apart co-axial relation and extending forwardly of said shaft upon opposite sides thereof respectively. The shanks 3 of the blades 1 and 2 are slidably mounted in the sleeves 8 for projection therefrom under the action of centrifugal force and rotatable therein to change the angle, or pitch, of the blades 1 and 2.

A pair of opposed oppositely spiraled guide slots 9 are formed in each sleeve 8 upon opposite sides thereof respectively. Secured in any suitable manner in each shank 3 to extend transversely therethrough is a guide bar 10 having its opposite ends projecting from said shank into the pair of slots 9 of the related sleeve 8 for a purpose presently apparent. The ends of each bar 10 are staggered as shown in dotted lines in Figure 2 for location in opposite ends of their related pair of slots 9. The relation of the slots 9 and bars 10 is such that when the shanks 3 are projected from the sleeves 8 the rods 10 and slots 9 will cooperate with a camming action to rotate the blades 1 and 2 oppositely in said sleeves and vary the pitch thereof in degree corresponding to the extent of projection of said shanks. The variations in pitch are in an angle decreasing direction, from normal position, so that speed of rotation of the windmill is limited.

The blades 1 and 2 are tensioned against projection from the sleeves 8 by means of a pair of axially aligned coiled springs 11 and 12, each of which is connected at one end to one of said bars 10 centrally thereof by a link 13. The opposite end of each spring 11 and 12 is looped around a nut 14. The nuts 14 are threaded onto opposite ends of a coupling bolt 15, said ends being oppositely threaded. Lock nuts 16 secure the nuts 14 to the bolts 15 in adjusted position. The bolt 15 is provided with a central wrench grip portion 17. Normally the described tensioning means holds the blades 1 and 2 in an inward position, respectively, established by co-action of the shoulders 4 with the outer ends of the sleeves 8. As will be seen, the connection of the springs 11 and 12 to the nuts 14 is such that when the blades 1 and 2 are rotated the springs may rotate therewith independently of the nuts 14 and bolts 15. By adjusting the bolt 14 the tension on the blades 1 and 2 may be varied as desired.

Uniformity in variation in pitch of the blades 1 and 2 is effected by gearing as follows. The inner edges of the shanks 3 are each toothed to provide a bevel gear sector 18. Rotatably mounted on the forward end of the windmill shaft 5, in front of the hub 7, is a duplex bevelled gear sector 19 eccentrically formed to mesh with said sectors 18, respectively, in any projected position of the blades 1 and 2. As will be manifest, the described gearing will effect rotation of the blades 1 and 2 in corresponding degree regardless of wear of the slots 8 and bars 10.

The construction, operation and advantages of my invention will, it is believed, be clear from the foregoing without further description.

Manifestly, the invention is susceptible of modification as regards details described without departing from the inventive concept and right is herein reserved to all such modifications falling within the scope of the claim appended hereto.

What I claim is:

In a variable pitch windmill structure, the combination with a rotatable shaft, of a hub fixed on said shaft and comprising a pair of sleeves disposed in co-axial spaced apart relation radially of said shaft on opposite sides thereof, respectively, a pair of blades rotatably mounted at their inner ends in said sleeves, respectively, for varying the pitch thereof and slidable in their respective sleeves for projection therefrom under the action of centrifugal force, co-acting camming devices on each sleeve and the inner end of the related blade for imparting rotary movement to said blade as an incident to projection thereof, and means for tensioning said blades against projection comprising a pair of tensioned springs disposed co-axially of each other and in the axis of said sleeves, the outer ends of said springs being connected to the inner ends of said blades, respectively, said means comprising devices connecting the inner ends of said springs together for relative rotation thereof under rotation of said blades and including a manipulative element for selectively varying the tension exerted by said springs, disposed in the space between said sleeves for access thereto.

CHARLES RAYMOND WROBBEL.